United States Patent
Venkatraman et al.

(10) Patent No.: US 11,734,302 B2
(45) Date of Patent: Aug. 22, 2023

(54) MULTI-DEVICE CONTEXT STORE

(71) Applicant: APPLE INC., Cupertino, CA (US)

(72) Inventors: Kartik Venkatraman, Santa Clara, CA (US); Umesh Vaishampayan, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 181 days.

(21) Appl. No.: 15/178,501

(22) Filed: Jun. 9, 2016

(65) Prior Publication Data
US 2017/0359415 A1 Dec. 14, 2017

(51) Int. Cl.
| | | |
|---|---|---|
| *G06F 16/00* | (2019.01) | |
| *G06F 16/27* | (2019.01) | |
| *H04B 1/3827* | (2015.01) | |
| *G06F 16/951* | (2019.01) | |
| *G06F 16/23* | (2019.01) | |
| *H04L 67/306* | (2022.01) | |
| *G06F 16/335* | (2019.01) | |
| *H04L 67/50* | (2022.01) | |
| *H04L 67/51* | (2022.01) | |

(52) U.S. Cl.
CPC .......... *G06F 16/27* (2019.01); *G06F 16/2358* (2019.01); *G06F 16/337* (2019.01); *G06F 16/951* (2019.01); *H04B 1/385* (2013.01); *H04L 67/306* (2013.01); *H04L 67/535* (2022.05); *H04L 67/51* (2022.05)

(58) Field of Classification Search
CPC .... G06F 16/27; G06F 16/337; G06F 16/2358; G06F 16/951; G06F 16/24532; H04L 67/16; H04L 67/22; H04L 67/306; H04B 1/385

USPC .......................................................... 707/620
See application file for complete search history.

(56) References Cited

U.S. PATENT DOCUMENTS

| | | | |
|---|---|---|---|
| 8,326,995 B2 * | 12/2012 | Chesta ................ | G06F 17/3087 |
| | | | 709/227 |
| 9,201,952 B1 | 12/2015 | Chau et al. | |
| 9,292,807 B2 | 3/2016 | Shahine | |
| 9,830,950 B2 * | 11/2017 | Rodriguez ............ | G06F 3/0482 |
| 9,836,503 B2 * | 12/2017 | Perry ................. | G06F 16/24532 |
| 10,148,546 B2 | 12/2018 | Venkatraman et al. | |
| 2003/0126136 A1 * | 7/2003 | Omoigui ................. | H04L 29/06 |
| 2004/0019640 A1 | 1/2004 | Bartram et al. | |
| 2006/0208943 A1 * | 9/2006 | Gronemeyer ........... | G01S 19/14 |
| | | | 342/357.41 |
| 2007/0050191 A1 * | 3/2007 | Weider .................... | G10L 15/22 |
| | | | 704/275 |
| 2008/0045138 A1 * | 2/2008 | Milic-Frayling .. | H04N 1/00244 |
| | | | 455/3.04 |

(Continued)

FOREIGN PATENT DOCUMENTS

WO 2016/120870 A1 8/2016

*Primary Examiner* — Vincent F Boccio
(74) *Attorney, Agent, or Firm* — Invoke

(57) ABSTRACT

In some implementations, a user device can maintain a multi-device context store. For example, the user device can receive device and/or user context information from multiple devices and store the context information in a local data store. The user device can collect local device and/or user context information and store the context information in the local context store. The user device can receive user/device context queries from client processes and send the client processes user/device context information from multiple devices in response to the queries.

26 Claims, 10 Drawing Sheets

(56) References Cited

U.S. PATENT DOCUMENTS

| | | |
|---|---|---|
| 2011/0258430 A1 | 10/2011 | Luukkala |
| 2012/0102497 A1 | 4/2012 | Stahl |
| 2013/0212212 A1* | 8/2013 | Addepalli ............... G06F 9/461 |
| | | 709/217 |
| 2013/0254329 A1 | 9/2013 | Lin et al. |
| 2014/0067455 A1 | 3/2014 | Zhang et al. |
| 2014/0189016 A1 | 7/2014 | Goldsmith et al. |
| 2015/0205880 A1* | 7/2015 | Perry ................ G06F 16/24532 |
| | | 707/771 |
| 2015/0319554 A1* | 11/2015 | Blanche ............ H04M 1/72412 |
| | | 455/41.2 |
| 2016/0050114 A1* | 2/2016 | John Archibald .... G06F 1/3234 |
| | | 370/254 |
| 2016/0094654 A1 | 3/2016 | Raman et al. |
| 2016/0106360 A1* | 4/2016 | Choi ...................... A61B 5/742 |
| | | 434/247 |
| 2016/0217476 A1 | 7/2016 | Duggal et al. |
| 2016/0232327 A1 | 8/2016 | Windridge et al. |
| 2016/0322082 A1* | 11/2016 | Davis .................... G06F 3/0485 |
| 2017/0024539 A1 | 1/2017 | Webb et al. |
| 2017/0025152 A1 | 1/2017 | Jaime et al. |
| 2017/0178001 A1* | 6/2017 | Anderson ............. H04L 67/306 |
| 2017/0206200 A1 | 7/2017 | Bajpai et al. |
| 2017/0359415 A1 | 12/2017 | Venkatraman et al. |
| 2019/0216395 A1 | 7/2019 | Geva et al. |

\* cited by examiner

| Local Context DB 114 | |
|---|---|
| Attribute | Value |
| BatteryLevel | 80% |
| ExtPower | False |
| Wi-Fi | True |
| CurrentLocation | Home |
| ScreenLit | True |
| LastUserInput | 20160205:0615 |

202 — BatteryLevel
204 — ExtPower
206 — Wi-Fi
208 — CurrentLocation
210 — ScreenLit
212 — LastUserInput

| Remote Context DB 116 | |
|---|---|
| Attribute | Value |
| BatteryLevel | 100% |
| ExtPower | True |
| Wi-Fi | True |
| CurrentLocation | Office |
| ScreenLit | False |
| LastUserInput | 20160205:1340 |
| WearableConn | True |
| HeartRate | 156 |

230 — BatteryLevel
232 — ExtPower
234 — Wi-Fi
236 — CurrentLocation
238 — ScreenLit
240 — LastUserInput
242 — WearableConn
244 — HeartRate

FIG. 2

MULTI-DEVICE CONTEXT STORE

TECHNICAL FIELD

The disclosure generally relates to determining user context and scheduling tasks based on user context.

BACKGROUND

Many modern computing devices collect information about user activities in order to predict or anticipate the user's behaviors and/or computing needs. Most of these devices attempt to predict or anticipate a user's behavior based on the data collected by a single device. However, most users have multiple devices. Thus, the data collected by a single device often provides an incomplete picture of the user's behavior and/or computing needs.

SUMMARY

In some implementations, a user device can maintain a multi-device context store. For example, the user device can receive device and/or user context information from multiple devices and store the context information in a local data store. The user device can collect local device context information and/or user context information and store the context information in the local context store. The user device can receive context queries from client processes requesting device context and/or user context information and send the client processes context information from multiple devices in response to the queries.

In some implementations, a user device can schedule tasks based on user behavior. For example, the user device can receive a task request that includes a time window and user/device context parameters for performing the task. The user device can predict a time when the user/device context is optimal for performing the task during the time window based on historical context data. For example, the user device can generate an optimal context score for the task based on the context parameters and the historical context data. The user device can execute the requested task at a current time within the time window when a context score for the current context exceeds a threshold determined based on the optimal context score.

Particular implementations provide at least the following advantages. By collecting and storing context information from multiple user devices, a clearer picture of the user's context, rather than individual device contexts, can be generated. By scheduling execution of tasks based on the actual current context relative to a predicted future context, rather than exclusively current context, the user device can execute tasks when the conditions or context of the user or device are optimal.

Details of one or more implementations are set forth in the accompanying drawings and the description below. Other features, aspects, and potential advantages will be apparent from the description and drawings, and from the claims.

DESCRIPTION OF DRAWINGS

FIG. 2 illustrates example context databases.

Like reference symbols in the various drawings indicate like elements.

DETAILED DESCRIPTION

Multi-Device Context Store

Figure 1:
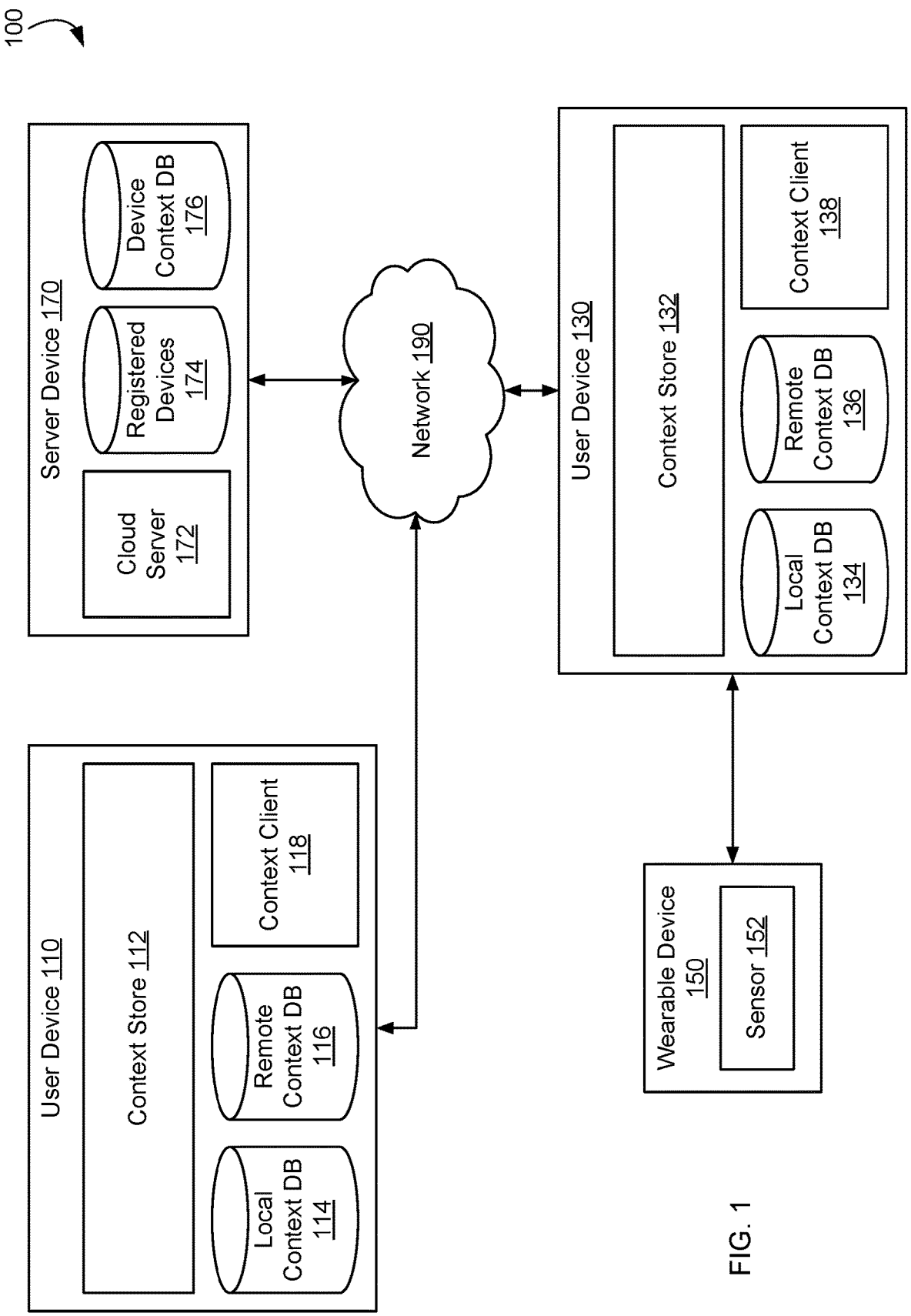
FIG. 1 is a block diagram of an example system for providing a multi device context store.

FIG. 1 is a block diagram of an example system 100 for providing a multi device context store. For example, system 100 can exchange context data (e.g., device context, user context, etc.) between devices and allow context clients to query the multi-device context store so that the context clients can determine a user context based on the multi-device context data.

In some implementations, system 100 can include user device 110. For example, user device 110 can be a computing device such as a smartphone, tablet computer, laptop computer, or wearable device (e.g., smart watch, smart glasses, etc.). User device 110 can be one of many devices (e.g., user device 130, wearable device 150) associated with a user and/or user account. For example, the user may have a user account with a vendor or service provider that provides various services to the user or to the user's devices. For example, the user can have an account with a cloud service provider that provides systems (e.g., cloud server 172) and devices (e.g., server device 170) that synchronize data between multiple user devices.

In some implementations, user device 110 can include context store 112. For example, context store 112 can be a process (e.g., daemon or background process) that collects context data from other processes running on user device 110. For example, context client 118 can submit context data (e.g., device state data, application state data, sensor data, location data, etc.) to context store 112. For example, the context data can include user context, such as a location of the user (e.g., at home, at work, at school, etc.) and/or an activity performed by the user (e.g., running, reading, sleeping, using a device, etc.), The context data can include device context, such as device state, application state, device sensor data, etc. Examples of device context can include the device's display being lit, the device is connected to Wi-Fi, the device is connected to a cellular data connection, the device's location, accelerometer data indicating the device is moving, etc. The context data can be submitted in the form of key-value (e.g., attribute-value) pairs. When context data is received by context store 112 from local context clients (e.g., local processes, applications, etc.), context store 112 can store the context data in local context database 114.

In some implementations, user device 110 can exchange context data with other user devices. For example, system 100 can include user device 130. User device 130 can be configured (e.g., hardware and/or software) similarly to user device 110. For example, user device 110 can be a tablet computer and user device 130 can be a smartphone. User device 130 can include context store 132 and local context database 134, for example. As described above with reference to user device 110, context store 132 can receive context data (e.g., key-value pairs) from context client 138 running locally on user device 130 and store the context data in local context database 134. To get a more complete picture of the user's context, user device 110 and user device 130 can exchange context data. For example, context store 112 on user device 110 can send context data from local context database 114 to context store 132 on user device 130. Upon receiving the context data from user device 110, context store 132 can store the context data in remote context database 136. Similarly, context store 132 on user device 130 can send context data from local context database 134 to context store 112 on user device 110. Upon receiving the context data from user device 130, context store 112 can store the context data in remote context database 116.

To establish communication between user device 110 and user device 130, each user device can obtain user device information from cloud server 172 that identifies each of the devices associated with the same user account. For example, user device 110 and user device 130 can be associated with the same user account with cloud server 172. Cloud server 172 can, for example, maintain a database 174 of devices registered to the user's account with cloud server 172. Registered devices database 174 can include, for example, records for each registered device that includes a user account identifier and a device identifier. The registered device information can be shared with the various devices associated with the user's account so that the devices can communicate with each other and exchange context data.

In some implementations, user device 110 and user device 130 can exchange context data through network 190. For example, network 190 can be a wide area network, local area network, cellular network, Wi-Fi network, or adhoc network between devices. For example, network 190 can be implemented through the internet using standard internet protocols. Network 190 can be a direct device to device network using peer-to-peer communications technologies like near field communication signals, Bluetooth, Bluetooth LE, or peer-to-peer Wi-Fi, for example.

In some implementations, context data can be exchanged between user device 110 and user device 130 using a broadcast mechanism. For example, establishing a communication channel with user device 130 and sending the context data directly to user device 130, user device 110 can broadcast context data using a Bluetooth advertising packet. Each user device within range of the Bluetooth broadcast can receive the context data and update its remote context database accordingly. For example, user device 110 can broadcast a Bluetooth LE advertisement packet that identifies user device 110 and has a payload encoded with context data from local context database 114. User device 130 can listen for and receive the advertisement packet, determine that the advertisement is from a user device associated with the same user account as user device 130 (e.g., as determined based on the registered device data received from cloud server 172), and decode the context data for user device 110 from the advertisement payload. User device 130 can then store the context data from user device 110 in corresponding remote context database 136 on user device 130.

Similarly, context data can be broadcast through cloud server 172 on server device 170. For example, user device 130 can broadcast context data through cloud server 170 instead of directing the context data to user device 110. User device 130 can send a context update message to cloud server 172 that includes context data updates from local context database 134. The context update message can, for example, identify the sending device and include a list of key-value pairs representing the context updates. Upon receipt of the context update message, cloud server 172 can update device context database 176 with the updated context data and forward the updated context data received from user device 130 to the other user devices (e.g., user device 110) associated with the same user account. Thus, user device 130 does not need to know which devices are associated with the user account or how to reach each user device associated with the user account. Additionally, since the communication with server device 170 can be performed through the internet, user device 130 does not have to be near user device 110 in order to share context updates with user device 110 as is the case with the near field communication (NFC) or Bluetooth communication mechanisms.

In some implementations, user device 110 and user device 130 can exchange context data according to various timing mechanisms or in response to various triggers. For example, context store 112 on user device 110 can be configured to send context data updates from local context database 114 to user context store 132 on user device 130 periodically (e.g., according to a configured time interval). Context store 112 on user device 110 can be configured to send context data updates from local context database 114 in response to detecting an change or update in local context database 114. For example, in response to receiving an updated or changed value for a corresponding attribute, context store 112 can broadcast the attribute value change to other user devices, as described above. In some implementations, user device 110 can send context data updates for specific context data that has been requested by other devices, as described further below.

In some implementations, a user device can serve as a context reporting proxy for other user devices. For example, user device 130 can serve as a context reporting proxy for wearable device 150. Wearable device 150 can, for example, be a smart watch that is connected to user device 130 (e.g., a smartphone). In some implementations, wearable device 150 can depend on user device 130 for some functions. For example, user device 130 may receive some communications (e.g., telephone calls, instant messages, text messages, etc.) and send notifications to wearable device 150 so that wearable device 150 can present the notifications to the user. Wearable device 150 may not have a cellular data connection and may rely on the cellular data or network data connection provided by user device 130.

In some implementations, wearable device 150 can have the same or similar features as user device 110 and/or user device 130. On the other hand, wearable device 150 might provide some features, such as sensor 152 (e.g., a heart rate sensor), that user device 130 does not have. Wearable device 150 can provide sensor data from sensor 152 and/or other device context information specific to wearable device 150 to user device 130 so that user device 130 can use the sensor data and/or context data on user device 130. When user device 130 receives the sensor data and/or context data from wearable device 150, user device 130 can store the sensor data and/or context data (e.g., sensor data is context data) in local context database 134 as if the context data for wearable device 150 is context data for user device 130. For example, user device 130 can store context data in local context database 134 that indicates that user device 130 is connected to wearable device 150 (e.g., key: value=wearableConnected:true) and context data that indicates a value or state associated with sensor 152 (e.g., key:value=heartrate:152), as described further with reference to FIG. 2. Since the context data for wearable device 150 is stored in local context database 134, user device 130 can share the context data in local context database 134 with other user devices (e.g., user device 110) as described above. Thus, user device 110 can use the context data associated with wearable device 150 to make decisions or provide various features even though user device 110 is not directly connected to (e.g., paired with) wearable device 150.

FIG. 2 illustrates example context databases 200. For example, local context database 114 and remote context database 116 can store context data as attribute-value pairs (e.g., key-value pairs) of data. Local context database 114 can store context data reported or submitted by local processes (e.g., applications, operating system, software utilities, hardware drivers, sensors, etc.) on user device 110. For example, a power monitoring process can submit an "80%" value for a "BatteryLevel" attribute to context store 112 on user device 110 and context store 112 can save the attribute-value pair as entry 202 in local context database 114. Similarly, the power monitoring process can determine that user device 110 is not connected to an external power source (e.g., the device is not charging and running on battery power) and send a "false" value for the "ExtPower" attribute indicating that user device 110 is not connected to an external power source and context store 112 can store the attribute-value pair as entry 204 in local context database 114.

User device 110 can include other processes that report context information to context store 112. For example, user device 110 can include a process that monitors and reports Wi-Fi connection state information (e.g., entry 206). User device 110 can include a process that monitors and reports the current location of user device 110 (e.g., entry 208). User device 110 can include a process that monitors and reports whether the device's screen is lit (e.g., entry 210). User device 110 can include a process that monitors and reports a timestamp corresponding to when the last user input was received (e.g., entry 212). The context data in local context database 114 can be reported by one or multiple processes. For example, the "LastUserInput" attribute of entry 212 can be reported by a single process that monitors all user input to user device 110 or by multiple different processes (e.g., applications) used by the user as the user interacts with user device 110. When context store 112 receives the attribute-value pairs of context data from local processes, context store 112 can store the attribute value pairs in local context database 114, as described above.

In some implementations, user device 110 can include remote context database 116. For example, remote context database 116 can be structured similarly to local context database 114 in that remote context database 116 stores context data as attribute-value pairs of data. However, the context data in remote context database 116 reflects the device state and/or context data of a user device (e.g., user device 130) other than user device 110.

In some implementations, remote context database 116 can include entries for some of the same attributes as local context database 114. For example, even though the context data stored in remote context database 116 on user device 110 is received from user device 130, there may be some standard or core attributes that are reported on all user devices (e.g., user device 110, user device 130). These core attributes can include a battery level attribute (e.g., entry 202, entry 230), an external power attribute (e.g., entry 204, entry 232), and/or a last user input attribute (e.g., entry 212, entry 240). However, while some of the reported attributes may be similar between devices, the values will be different depending on the current state or context of the respective devices. For example, the reported values for battery level, external power connection, and/or last user input attributes may be different between devices based on the device's current configuration or status.

In some implementations, remote context data database 116 can include attributes that are different than those in local context database 116. For example, even though remote context database 116 is stored on user device 110, remote context database 116 reflects the context of user device 130. In some implementations, user device 130 may have a different configuration (e.g., different applications, different hardware, different sensors, etc.) than user device 110. Thus, the context data reported to context store 132, shared with context store 112 and stored in remote context database 116 on user device 110 may be different than the context data (e.g., attribute-value pairs) stored in local context database 114. For example, user device 130 may be configured to pair with a wearable device (e.g., wearable device 150) and user device 110 may not. Thus, context store 132 on user device 130 may collect context data associated with wearable device 150. The wearable device context data can then be shared with context store 112 on user device 110 and stored in remote context database 116 as entry 242 (e.g., wearable connection status) and entry 244 (e.g., wearable sensor data).

In some implementations, user device 110 can determine a user context based on data from local context database 114 and remote context database 116. For example, individually, local context database 114 and remote context database 116 provide information reflecting the state or context of individual devices; however by analyzing the context data from both databases (e.g., context data from multiple devices), user device 110 can more accurately determine the current context of the user. For example, the user context can include a location of the user (e.g., at home, at work, at school, etc.) and/or an activity performed by the user (e.g., running, reading, sleeping, using a device, etc.), The user context can be determined and/or verified using device context data (e.g., device state data, sensor data, etc.) from multiple devices. For example, if user device 110 relied solely upon local context database 114 (e.g., local context data) to determine the location of the user, user device 110 would determine that the user is at home (e.g., entry 208). However, by analyzing the location (e.g., entries 208 and 236) and last user input (e.g., entries 212 and 240) data from both local context database 114 and remote context database 116, user device 110 can determine that the user is actually located at the office since the latest user input was received from user device 130 that is located at the user's office.

In some implementations, the context data in remote context database 116 can allow user device 110 to provide features or services that user device 110 cannot provide on its own. For example, remote context database 116 can include entry 244 that includes heartrate sensor data from wearable device 150. User device 110 may not have a heartrate sensor, but because user device 110 has received heartrate data from wearable device 150 through user device 130, user device 110 can now provide heartrate based services and/or information to the user. For example, user device 110 can track the user's heartrate, determine the user's fitness level, and/or make recommendations regarding the user's fitness routine. As another example, because user device 110 is receiving battery level (e.g., entry 230) and charging status (e.g., entry 232) data for user device 130, user device 110 can prompt (e.g., present a graphical element, audio warning, etc.) the user to plug in user device 130 when the battery level of user device 130 (as indicated in remote context database 116) drops below a threshold level (e.g., 20%) and user device 130 is not plugged in to an external power source (e.g., ExtPower=false). Thus, by sharing context data between devices, user device 110 can make a better determination of the user's context and/or provide features or services that would otherwise be unavailable on user device 110.

Figure 3:
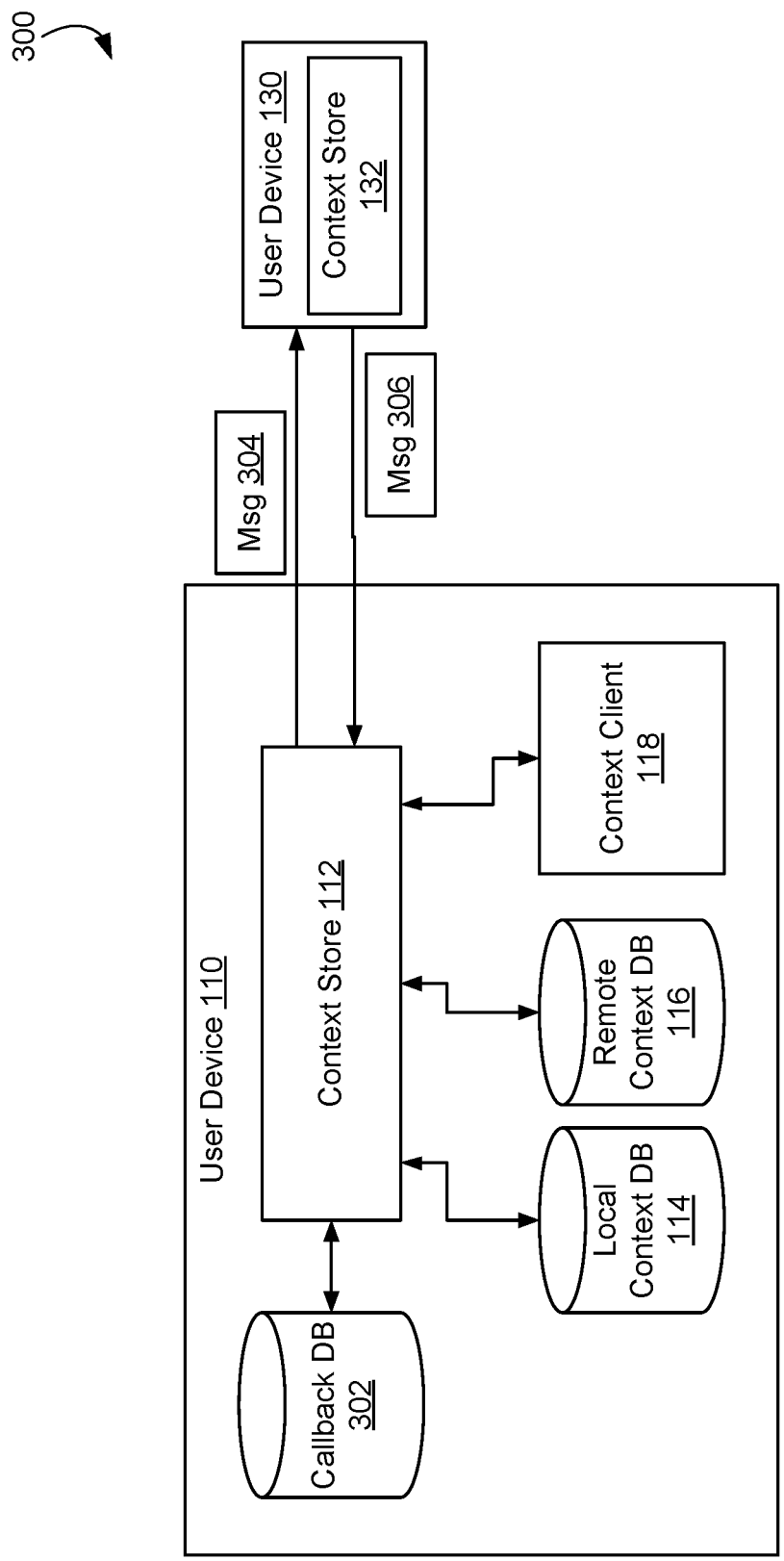
FIG. 3 is a block diagram of an example system for processing context client queries submitted to a context store.

FIG. 3 is a block diagram of an example system 300 for processing context client queries submitted to a context store. In some implementations, context client 118 can submit context queries to context store 112 on user device 110. For example, context client 118 can be a user application installed on user device 110. Context client 118 can be a process, function, utility, daemon, etc., of the operating system of user device 110. Context client 118 can be configured to submit to and/or request from context store 112 context information managed by context store 112.

In some implementations, context store 112 can receive a context query from context client 118. For example, context client 118 can be a process configured to remind a user to plug in and/or charge various user devices when the battery level of a user device drops below a threshold level. Context client 118 can submit a context query (e.g., request) to context store 112 requesting the current value of the "BatteryLevel" attribute. For example, the context query can include a list of attributes for which context client 118 is requesting values. Upon receipt of the query, contest store 112 can obtain the current values for the attributes specified in the query from local context database 114 and/or remote context database 116 and return a mapping of device identifier to attribute-value pairs for the requested attributes that reflect the current values associated with the specified attributes on each device.

In some implementations, a context query can specify the scope of the query. For example, context client 118 may request context information for only the local device (e.g., user device 110). In response to receiving a context query that specifies a local device only scope, context store 112 can search local context database 114 for attributes corresponding to the attributes specified in the context query. Similarly, context client 118 may request context information for only a specified remote device (e.g., user device 130). In response to receiving a context query that specifies or identifies a remote device, context store 112 can search the remote context database (e.g., remote context database 116) corresponding to the identified remote device. In some situations, context client 118 can request context information for all devices. In response to receiving a context query that specifies all devices (e.g., the request can include a listing of device identifiers or just indicate all devices), context store 112 can search local context database 114 and all remote context databases (e.g., there can be one remote context database for each remote user device) for context data corresponding to the attributes specified in the context query. After the context data is obtained from local context database 114 and/or remote context database 116 according to the scope specified in the context query, context store 112 can send the context information (e.g., device ID-attribute-value mappings) to context client 118. Context client 118 can then use the context information to provide services and/or information to the user (e.g., inform the user about the battery charge state of various user devices).

In some implementations, context client 118 can register interest in receiving updates to context data. For example, context client 118 can submit a context query to context store 112 that indicates that context client 118 is interested in receiving status or context updates when context changes occur. To register interest in context updates, context client 118 can submit a context query that identifies attributes that the context client is interested in, specifies the scope of the query (e.g., local device, specified device, all devices, etc.), and indicates that the client is interested being called back when the values of the specified attributes change.

When context store 112 receives a context query that indicates that context client 118 is requesting context updates, context store 112 can obtain context data corresponding to the context query and send the context data to context client 118, as described above. However, when the context query indicates that context client 118 is requesting context updates (e.g., requesting a callback when an attribute value changes), context store 112 can store the context query in callback database 302 so that context store 112 can send context client 118 context updates when the attributes identified in the context query change values in the future.

In some implementations, a context query can specify attribute values that should trigger a callback to a context client. For example, context client 118 can generate a context query, as described above, that specifies that context client 118 is requesting to be called back when an update or change to an attribute value is detected. For example, context client 118 can submit a context query indicating that context store should notify (e.g., call back) context client 118 when the "BatteryLevel" attribute value for any user device drops below 20%. The context query in this case can include the battery level attribute (e.g., "BatteryLevel"), a relational operator (e.g., greater than, less than, equal to, etc.), the attribute value (e.g., 20%), the scope of the query (e.g., all devices), and a value indicating that context client 118 should receive context updates (e.g., callbacks) for future context changes for any user device where the battery level is less than 20%.

When context store 112 receives context data changes or updates (e.g., locally and/or from other user devices), context store 112 can search callback database 302 for callback queries that relate to the changed context data (e.g., attributes and/or attribute values). When context store 112 identifies a callback query that is related to a changed attribute or attribute value, context store 112 can notify the context client that submitted the context query (e.g., context client 118) that the current context corresponds to the criteria specified in the context query. Thus, context client 118 can be notified by context store 112 when any change to a specified attribute occurs or when a change occurs that meets the criteria specified in the context query.

In some implementations, a context query can cause a context data exchange between user devices. As described above, user device 110 and/or user device 130 can broadcast context data (e.g., attribute-value pairs) on a periodic basis. However, in some implementations, a user device (e.g., user device 130) can be selective about which attributes and attribute values are broadcast to other user devices. For example, user device 130 can be configured to periodically broadcast a configurable (e.g., core) set of attributes and attribute values (e.g., battery level, external power, location, etc.). For other attributes, user device 130 may broadcast attribute-value pairs when another device (e.g., user device 110) has expressed interest in those attribute-value pairs.

As described above, context store 112 can receive a context query from context client 118 indicating that context client 118 is requesting heartrate data from user device 130. In response to receiving the query, context store 112 can send a message 304 to context store 132 on user device 130 requesting context data corresponding to the heartrate attribute. Context store 132 can obtain the heartrate attribute value and send the heartrate attribute-value pair to context store 112 in message 306. Context store 112 can then update remote context database 116 with the heartrate attribute-value data and send the heartrate attribute-value pair to context client 118.

Similarly, context store 112 can receive a context query from context client 118 indicating that context client 118 is interested in receiving notifications when the heartrate attribute on user device 130 (e.g., and/or other devices) changes or meets a specified condition (e.g., heartrate is greater than a value, heartrate is less than a value. In response to receiving the query, context store 112 can send a message 304 to context store 132 on user device 130 indicating that context store 112 is requesting context data updates corresponding to the heartrate attribute. In response to receiving message 304, context store 132 can obtain the current heartrate attribute value and send the heartrate attribute-value pair to context store 112 in message 306. When context store 132 is notified (e.g., in message 304) that context store 112 is interested in receiving updates regarding the heartrate attribute, context store 132 can monitor for updates to the heartrate attribute and broadcast the heartrate updates when the heartrate attribute value changes or periodically, as described above. Upon receipt of the heartrate context data, context store 112 can update remote context database 116 with the heartrate attribute-value data and send the heartrate attribute-value pair to context client 118 or notify context client 118 when the heartrate attribute value meets the criteria or conditions specified in the context query. Thus, a user device can selectively broadcast a context data attribute (and not broadcast other attributes) based on whether another user device has expressed interest in the attribute.

In some implementations, the context data can be broadcast with other data that is regularly broadcast by the user device. For example, the context data can be added to other regularly broadcast state data such that the context data is "piggy-backed" on messages sent by other services on the user device. Thus, in some implementations, broadcasting the context data does not require the additional overhead and/or resources required to generate and broadcast a completely new message.

Scheduling Activities Based on Context

Figure 4:
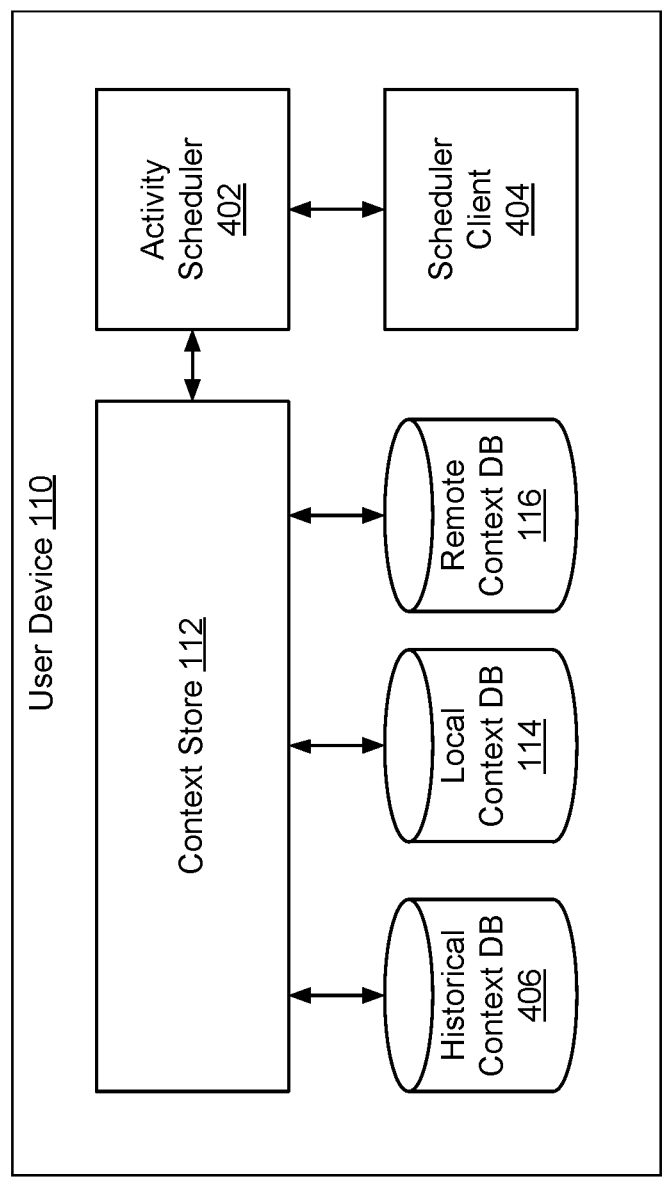
FIG. 4 is a block diagram of an example system for scheduling activities based on context.

FIG. 4 is a block diagram of an example system 400 for scheduling activities based on context. For example, system 400 can determine when to initiate an activity (e.g., task, process, operation, etc.) on user device based on a comparison between a predicted optimal context and a current context as determined based on context data collected by context store 112. For example, the activity or task can be performed by the operating system of the user device and/or an application running on the user device.

In some implementations, system 400 can include activity scheduler 402. For example, activity scheduler 402 can be a process (e.g., operating system utility, daemon, background process, etc.) executing on user device 110 and configured to determine a time when the user context or device context is optimal for running a requested activity.

In some implementations, system 400 can include scheduler client 404. For example, scheduler client 404 can be a process (e.g., application, operating system utility, daemon, etc.) running on user device 110. Scheduler client 404 can submit an activity request to activity scheduler to perform an activity (e.g., task, operation, etc.). For example, scheduler client 404 may need to perform a networking task (e.g., download data, upload data, communicate with other devices, etc.) that requires turning on Wi-Fi, Bluetooth, or other communications subsystems (e.g., radios). Scheduler client 404 can submit an activity request that specifies the need to access the network. In response to receiving the request, activity scheduler 402 can determine the best time for scheduler client 404 to perform the networking task and notify scheduler client 404 when scheduler client 404 can perform the networking task. Similarly, activity scheduler 402 can determine the optimum time to perform CPU intensive tasks, prefetch application data in anticipation of a user invocation of an application, and/or other tasks based on the parameters specified in the activity request.

In some implementations, an activity request can include parameters that specify a time window for performing the requested activity. For example, the activity may be performed by scheduler client 404 (or some other process), however, scheduler client 404 can submit an activity request that specifies parameters that activity scheduler 402 can use to determine the optimal time for scheduler client 404 to perform the corresponding task. For example, scheduler client 404 can generate an activity request that specifies a time window for performing a task. In some implementations, the activity request can include an indication that the task repeats over some fixed or variable time interval and activity scheduler 402 can determine (e.g., infer) current and future time windows based on the specified time window and the specified interval for the repeating task. The time window can be defined by a start time and an end time specified by scheduler client 404 in the activity request. The time window is a defined period of time during which the requested activity should be performed. The time window can be defined by a recurrence period (e.g., time interval). For example, if the recurrence period is seven days, then the task window defined by start and end times, can be repeated every seven days. When the activity request is received by activity scheduler 402, activity scheduler 402 will determine the best time within the specified time window for performing the requested activity, as described further below.

In some implementations, an activity request can specify a priority for the requested activity. For example, the priority (e.g., high, medium, low, maintenance) can be defined by scheduler client 404 in the activity request. Alternatively, the priority can be automatically determined by activity scheduler based on the identity or type of the scheduler client 404. For example, when activity scheduler 402 receives an activity request from an operating system process (e.g., background process, daemon, etc.), activity scheduler 402 can assign a maintenance priority level to the activity request. When activity scheduler 402 receives an activity request from a frequently invoked user application (e.g., to prefetch application data from a network resource), activity scheduler 402 can assign a high priority to the activity request.

In some implementations, an activity request can specify the amount of work that will be performed when the activity is performed. For example, the amount of work can be specified as a duration of time (e.g., the activity will last 1 minute, 5 minutes, etc.). The amount of work can be specified as an amount of data (e.g., 2 GB of data to transmit/receive). The amount of work can be specified as a percentage of CPU cycles required for the activity and/or an amount of memory required for the activity.

In some implementations, an activity request can specify a context for performing the requested activity. For example, scheduler client 404 may be a frequently invoked software application that is scheduling a prefetch activity to prefetch application data in advance of the user invoking scheduler client 404. Scheduler client 404 can specify attributes and corresponding attribute values that define a user or device context during which the prefetch activity should be run.

The activity request can specify a network context. For example, if the prefetch activity will require a network connection, the activity request can specify a required network context. For example, the activity request can specify attributes and/or attribute values corresponding to a required network connection type (e.g., Wi-Fi, cellular, etc.), a required bandwidth (e.g., 10 megabits download, 4 megabits upload), and/or a required connection quality (e.g., high, medium, low, etc.).

The activity request can specify a user activity context. For example, the activity request can specify attributes and attribute values indicating that user device 110 not be in use by the user (e.g., "inUse" attribute=false), or that the user be asleep (e.g., "userSleeping"=true), or that the user is performing some other activity (e.g., driving, walking, running, etc.). The user activity context can include attributes and attribute values indicating that the device's display screen is lit and/or that the device is connected to a peripheral device, such as headphones, Bluetooth speakers, a wearable device, or an in-dash entertainment system in an automobile, for example.

The activity request can specify a power context. For example, the activity request can specify attributes and attribute values corresponding to a battery charge level of the device (e.g., a percent charge), a charging state (e.g., plugged in, charging, not plugged in, a particular stage of charging, etc.)

The activity request can specify an application context. For example, a user may install the same application on different devices or complementary applications (e.g., one application provides data to another application) on the same or different user devices. Scheduler client 404 may be configured to perform an activity in response to a state change in another application (e.g., another instance of the same application or a different application) or a reported state of another application on the same device or different user device. Thus, scheduler client 404 can submit an activity request that specifies an attribute or attribute value that is specific to another application and reported by the other application to context store 112.

In some implementations, activity scheduler 402 can determine when to perform an activity (e.g., run a task) based on the activity request and the current context. For example, activity scheduler 402 can determine, based on the parameters of the activity request, when during the specified time window to run the requested activity. Activity scheduler 402 can determine when to run the requested activity based on historical context data and current context data. For example, activity scheduler can determine or predict based on historical data when the best or optimal conditions will exist within the specified time window for performing the activity. For example, if an activity request specifies attributes and attribute values that require the device to be plugged in and connected to Wi-Fi, activity scheduler 402 can determine when during the specified window those conditions or context will exist. For example, activity scheduler 402 can generate scores for different times during the specified time window representing probabilities that the specified conditions or context will exist at the corresponding time and select the highest probability as optimal score.

In some implementations, even if the activity does not explicitly require the device to be plugged in or that its data transfer occur over Wi-Fi rather than a cellular data connection, the scheduler may choose a time that where the device is plugged in and/or connected to Wi-Fi because these conditions yield the best combination of power efficiency and performance in the given window.

Alternatively, the scores can be indicative of a quality of the specified conditions or context. For example, an activity request may require a Wi-Fi connection and the score for the activity can be determined based on the quality of the Wi-Fi connection (e.g., 0-1 score indicating quality, where 0.95 is high quality, 0.2 is low quality, and 0 is no connection) rather than a score based solely on whether the Wi-Fi connection exists (e.g., a 0 or 1 score indicating that there is or is not a connection). Activity scheduler 402 can then determine a threshold value based on the optimal score (e.g., threshold can be 80% of optimal score). When a score generated for a current context within the specified time window exceeds the determined threshold value, activity scheduler 402 can notify scheduler client 404 that scheduler client 404 can perform the requested activity (e.g., run the requested task), as described further below.

In some implementations, user device 110 can include historical context database 406. For example, historical context database 406 can store historical context data corresponding to the context data in local context database 114 and/or remote context database 116. As context store 112 receives context data (e.g., local context data, remote context data, etc.), context store 112 can store the context data in local context database 114 and/or remote context database 116, as described above. Local context database 114 and/or remote context database 116 can represent the current context, for example. Context store 112 can also store the received context data in historical context database 406, for example. Context entries in historical context database 406 can include the attribute-value pairs of data stored in local context database 114 and/or remote context database 116, as described with reference to FIG. 2. Context entries in historical context database 406 can include device identifiers that identify from which device the context entry data came. Context entries in historical context database 406 can include a timestamp indicating the date and/or time when the context data was reported to the respective context store. For example, if a local context client reports an attribute-value pair of data to a local context store, the timestamp stored with the context entry can represent the time when the local context client reported the attribute-value pair to the local context store. When a remote context store sends context data to a local context store, the timestamps for context entries in historical context database 406 will represent the time when the remote context store received the context data, not the time when the context data was transmitted between context stores. Thus, context store 112 can determine a timeline of context changes based on the historical context data and predict, based on historical context patterns, future contexts of user device 110 and/or the user of user device 110.

Figure 5:
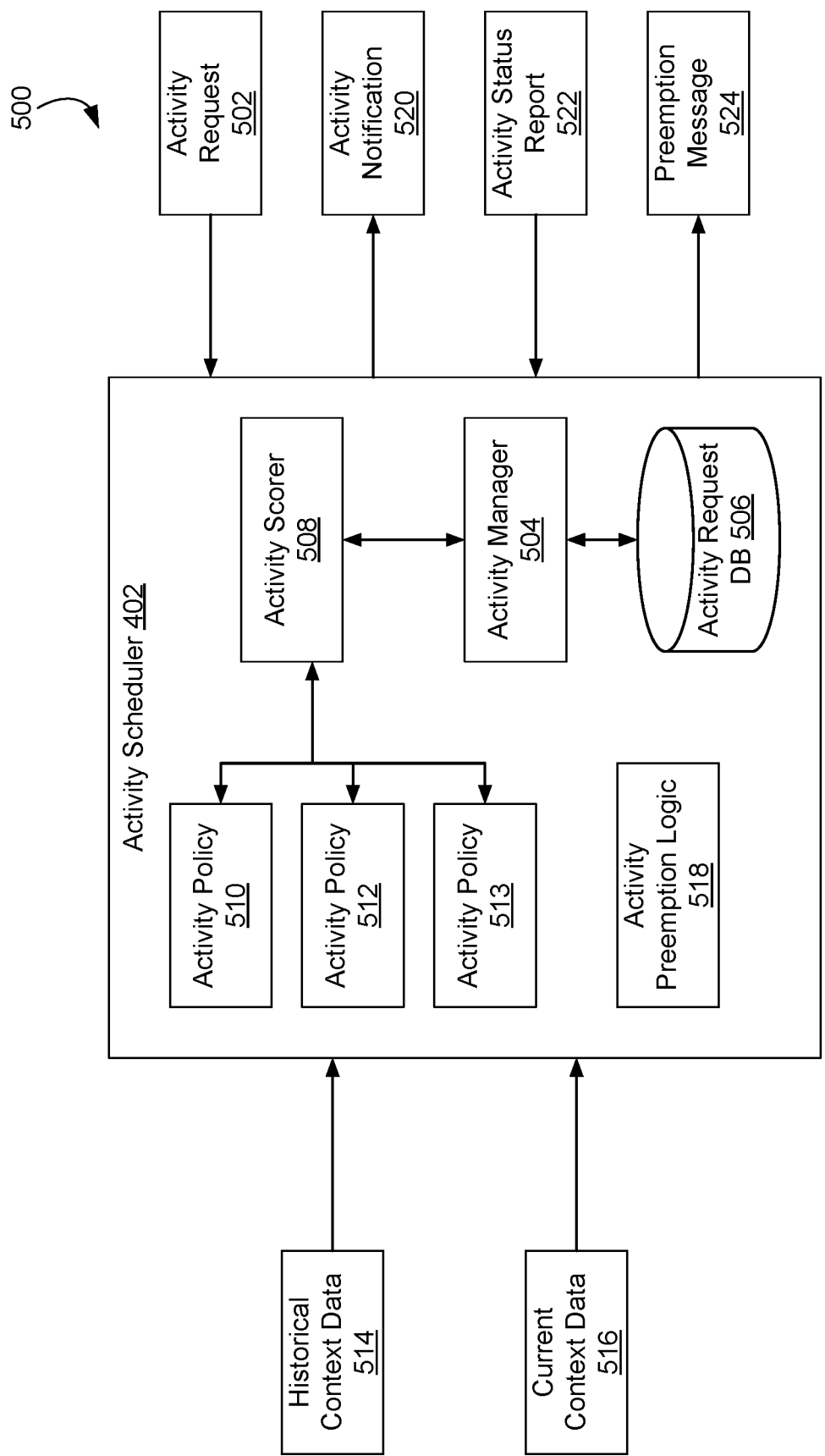
FIG. 5 is a block diagram of an example system for determining when to perform a requested activity on a user device.

FIG. 5 is a block diagram of an example system 500 for determining when to perform a requested activity on a user device. For example, activity scheduler 402 can receive activity request 502. Activity request 502 can include information describing parameters (e.g., a time window, priority, size, context, etc.) for performing an activity, as described above. When activity scheduler 402 receives activity request 502, activity manager 504 can store activity request 502 in activity request database 506. For example, activity request database 506 can store multiple activity requests received by activity scheduler 402 from multiple different scheduler clients. Activity scheduler 402 can keep track of each activity request in activity request database and monitor context data to determine the best time to run each requested activity, as described further below.

In some implementations, activity manager 504 can send a message (e.g., API invocation) to activity scorer 508 requesting that activity scorer 508 determine a score for activity request 502. For example, activity manager 504 can divide the time window (e.g., 1:00 am-1:05 am) into blocks of time (e.g., 1 minute, 30 seconds, etc.). For each block of time within the time window (e.g., 1:00 am, 1:01 am, 1:02 am, etc.) activity manager 504 can send a request to activity scorer 508 to score activity request 502 based on the context parameters specified in activity request 502. For example, activity manager 504 can send activity scorer 508 the context parameters (e.g., attribute-value data pairs) and a time (e.g., 1:01 am) corresponding to a block of time. For example, the context parameters can specify that the device should be connected to Wi-Fi (e.g., "Wi-Fi"="true"), that the device should be connected to external power (e.g., "ExtPower"="true"), and that the user should be asleep (e.g., "UserSleeping"="true").

In some implementations, activity scorer 508 can obtain individual scores for each context parameter (e.g., attribute-value pair) within a specified block of time. For example, when activity scorer 508 receives context parameters and a time from activity manager 504, activity scorer 508 can request that an activity policy (e.g., activity policy 510, activity policy 512, etc.) determine a score for the attribute corresponding to the specified time. For example, activity policy 510 can be a power policy. Activity scorer 508 can send the context parameters and the time specified by activity manager 504 (e.g., 1:01 am) to activity policy 510. Activity policy 510 can obtain historical context data 514 (e.g., from historical context database 406 and through context store 112) and determine based on historical context data 514 a score that represents whether the predicted power conditions at 1:01 am on the current day are sufficient to satisfy the conditions of the activity request 502. For example, activity policy 510 can return a score the represents the probability that user device 110 will be connected to external power at 1:01 am. Activity policy 510 can then return the score to activity scorer 508.

Similarly, activity scorer 508 can send the context parameters and the specified time to activity policy 512. For example, activity policy 512 can be a networking policy that can generate a score representing the predicted quality of network conditions at the specified time. As described above, activity request 502 can specify an amount of work associated with activity request 502. For example, activity request 502 can specify that activity request corresponds to a networking task that requires a Wi-Fi connection and will upload or download 2 GB of data. Activity policy 512 can analyze historical context data to predict network conditions around the requested time (e.g., 1:01 am) and generate a score that represents whether the network connection that normally exists around 1:01 am is suitable for transmitting the 2 GB of data. Alternatively, activity policy 512 can determine, based on historical context data 514, a probability that the value of the "Wi-Fi" attribute will be "true" at 1:01 am on the current day. After determining the score, activity policy 512 can send the score to activity scorer 508.

As another example, activity scorer 508 can send the activity request context parameters to activity policy 513. For example, activity policy can be a user sleep policy that predicts the likelihood that the user is sleeping at the specified time. In this case, activity policy 513 must determine or predict a user context, not just a device context. In some implementations, the user context can be determined by another process running on user device 110 that submits the "UserSleeping" attribute and determined value representing whether the user is sleeping to context store 112 for entry into the local context database 114 and/or historical context database 406. In this case, activity policy 513 can search historical context data 514 for "UserSleeping" attribute entries and corresponding values to generate a score representing the probability that the user will be sleeping at "1:01 am."

In some implementations, activity policy 513 can determine a score based on a combination of device contexts. For example, activity policy 513 can obtain historical context data 514 that indicates values for location (e.g., "CurrentLocation"), screen lit (e.g., "ScreenLit"), and last user input (e.g., "LastUserInput" attributes for multiple (e.g., all) user devices. The user's location, screen lit, and last user input values combined with the time of day can be a good indication of the user's sleep context. For example, if the historical context data for each device indicates that at the requested time of day (e.g., 1:01 am) the user is typically at home, the device's screen is not lit, the last user input was more than 10 minutes ago, and the time corresponds to an empirically determined normal sleep time (e.g., 1 am), then activity policy 513 can determine that the user is likely to be asleep. Activity policy 312 can collect these attributes and corresponding values from historical context data 514 corresponding to each user device and determine a score representing the probability that the user will be sleeping at the requested time (e.g., 1:01 am). Activity policy 513 can then send the determined score to activity scorer 508.

In some implementations, activity scorer 508 can determine an activity score for the requested activity based on the activity policy scores. For example, activity scorer 508 can average the attribute scores received from each activity policy to determine a score for the activity. Alternatively, activity scorer 508 can multiply the attributes scores to generate an activity score. Thus, if one of the required attribute values has a zero probability of occurring, the score (e.g., probability) for the requested activity will be zero at the requested time. After the score for the requested activity is determined for the requested time block (e.g., 1:01 am), activity scorer 508 can send the activity score to activity manager 504.

In some implementations, activity manager 504 can determine the optimum score and corresponding time for the requested activity. For example, activity manager 504 can receive an activity score from activity scorer 508 for each time block within the specified time window. Activity manager 504 can determine the best score (e.g., optimal score) and corresponding time received from activity scorer 508. The optimal score can be a predictor of the best or optimal time during the specified time window for performing the requested activity, for example. Activity manger 504 can store the optimal score and corresponding time in association with activity request 502 in activity request database 506.

In some implementations, activity scheduler 402 can monitor context data to determine when to run the activity corresponding to activity request 502. For example, activity scheduler 402 can receive current context data 516 from context store 112. Activity scheduler 502 can register interest in context data (e.g., attributes, attribute values) specified in activity request 502 and receive a callback from context store 112 when context data items change state. Activity scheduler 502 can register interest in all context updates received by context store 112 and receive a callback from context store 112 when context data items change state. Activity scheduler 502 can request specific context data, as needed.

In some implementations, in response to receiving current context data 518, activity manager 504 can identify activity requests in activity request database 506 that have time windows corresponding to the current time. Activity manager 504 can then determine which of the identified activity requests are ready to run based on the current context. For example, activity manager 504 can request a current score for activity request 502 from activity scorer 508.

In some implementations, activity scorer 508 can determine a current score for activity request 502 based on current context data 516. For example, activity scorer 508 can receive from activity manager 504 a request to score an activity request (e.g., activity request 502) having a time window that corresponds to the current time. The request can include the context parameters for the activity request and the current time. Activity scorer 508 can then generate an activity score as described above for the current time based on current context data 516 and/or historical context data 514. For example, activity policies 510, 512 and/or 514 can generate a score based on current context data 516 and/or historical context data 514 as described above. Activity policies 510, 512, and/or 514 can deliver the scores to activity scorer 508 so that activity scorer 508 can generate a current score for activity request 502 based on current context data 516. After computing the current score, activity scorer 508 can send the current activity score for activity request 502 to activity manager 504.

In some implementations, activity manager 504 can determine when to run a task based the predicted optimal score and the current task score. For example, activity manager 504 can determine a threshold value as a portion (e.g., 80%, 75%, etc.) of the optimal score. As time progresses through the time window specified in activity request 502, activity manager 504 can receive a current activity score for each block of time (e.g., every 1 minute) and compare the current activity score to the threshold value. When the current activity score exceeds the threshold value, the activity manager 504 can send activity notification 520 to the requesting scheduler client (e.g., scheduler client 404). Activity notification 520 can, for example, indicate that scheduler client 404 should run the activity corresponding to activity request 502 at the current time.

In some implementations, activity scheduler 402 can preempt or interrupt a running activity in response to receiving current context data 516. For example, to free up computing resources (e.g., CPU cycles, battery charge, network bandwidth, etc.) in anticipation of the execution of new activities, activity preemption logic 518 can identify running activities (e.g., tasks, jobs, etc.) on user device 110 that should be terminated or suspended. For example, scheduler clients (e.g., scheduler client 404) can report the status of executing activities to activity scheduler 402 in activity status report 522. Activity status report 522 can include information describing the amount of work done (e.g., amount of data processed, elapsed time, etc.) and/or the current state of the activity (e.g., running, completed, suspended, terminated, etc.). When activity scheduler 402 receives activity status report 522, activity manager 504 can store the status information in activity request database 506 in association with the corresponding activity request. Activity preemption logic 518 can then use the activity status information to determine which activities to suspend or terminate. For example, activity preemption logic 518 can suspend or terminate any activities that have not finished within a period of time (e.g., as specified in the corresponding activity request). Activity preemption logic 518 can suspend or terminate running activities by sending activity preemption message 524 to the corresponding scheduler client indicating that the scheduler client should suspend or terminate the running activity.

Figure 6:
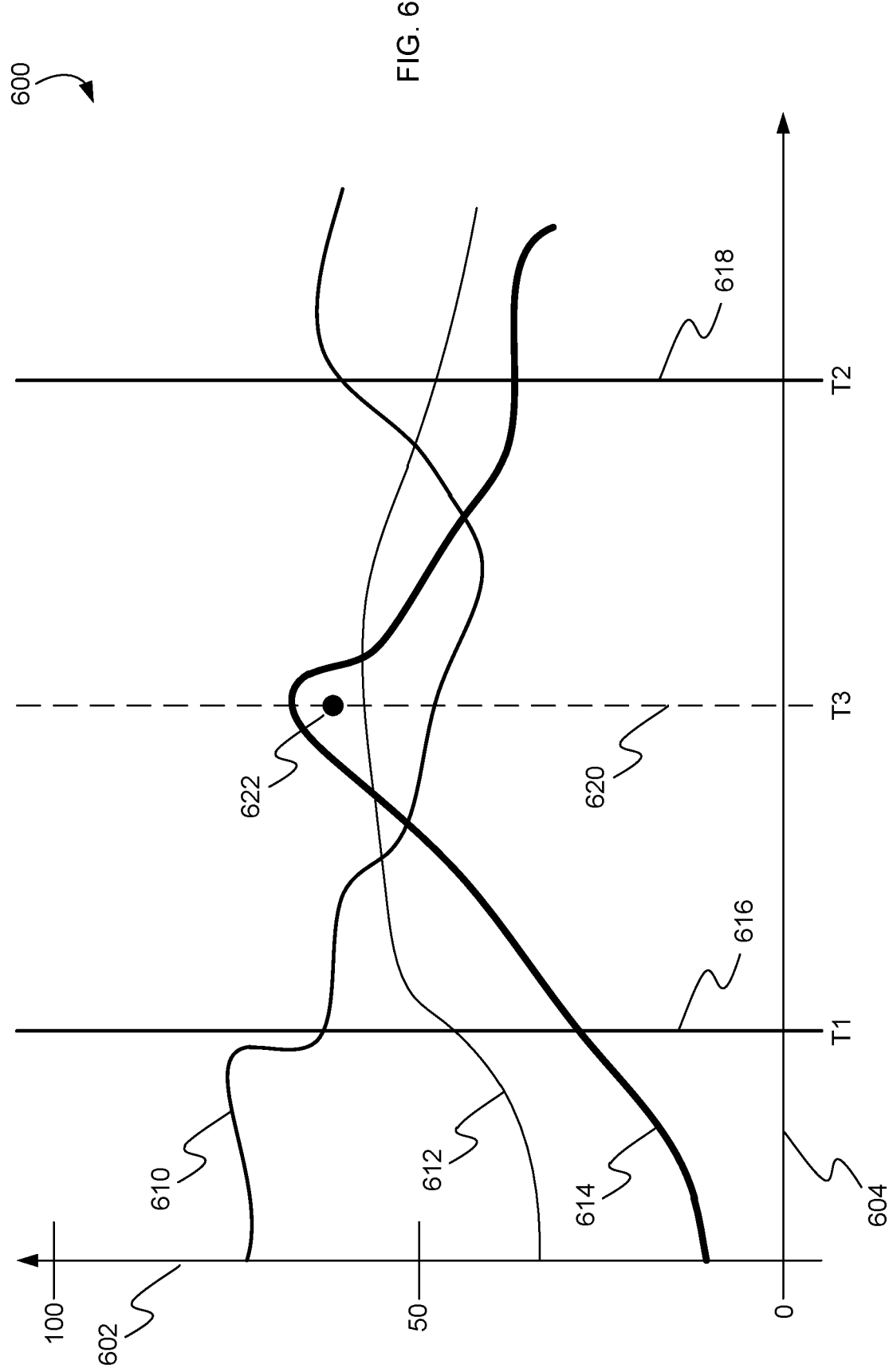
FIG. 6 is a graph illustrating an example optimal score determination for an activity request.

FIG. 6 is a graph 600 illustrating an example optimal score determination for an activity request. For example, axis 602 (e.g., y-axis) can correspond to a range of scores (e.g., 0-100, 0-1, etc.) generated by an activity policy (e.g., activity policy 510, 512, and/or 513). Axis 604 (e.g., x-axis) can correspond to a range of time. Line 610 can correspond to scores generated for an activity request over time by activity policy 510, for example. Similarly, line 612 and line 614 can correspond to scores generated for an activity request over time by activity policies 512 and 514, respectively. For example, each policy can be configured to generate a score for an activity request based on the parameters of the activity request (e.g., context parameters) and historical context data.

In some implementations, the score can be predictive of how good the context conditions will be for executing the activity associated with (e.g., defined by) the activity request at a corresponding future time. The score does not just account for the predicted network conditions, but also how the predicted network conditions relate or satisfy the parameters and/or context criteria of the corresponding activity request. For example, the scores along line 610 can be predictive of how good power conditions will be for performing the requested activity at corresponding times. Thus, predicted poor power conditions can still produce a high score if the corresponding requested activity does not require or use a lot of power (e.g., as determined by the amount of work to be done by the activity).

Similarly, scores along line 612 can be predictive of how good networking conditions will be for performing the requested activity at corresponding times. Thus, predicted poor network conditions can still produce a high score if the corresponding requested activity does not require a network connection or a lot of bandwidth. Scores along line 612 can be predictive of how good the user context will be for performing the requested activity at corresponding times relative to a user context specified in the activity request, as described above.

In some implementations, activity manager 504 can predict an optimal score and corresponding time within a time window specified by an activity request. For example, activity request 502 can specify a time window for performing a corresponding activity that starts at time "T1" indicated by line 616 and ends at time "T2" indicated by line 618. For each time block (e.g., 30 seconds, 1 minute, etc.) within the time window, activity scorer 508 can calculate an activity score by combining the policy scores illustrated by lines 610, 612 and 614 and deliver the activity score to activity manager 504. For example, activity scorer 508 can combine (e.g., average) the policy scores at time "T3" indicated by line 620 to generate an activity score represented by dot 602. Activity manager 504 can determine the highest activity score within the activity window (e.g., T1-T2) to determine the optimal activity score (e.g., dot 622) and corresponding time (e.g., "T3") for the activity request.

Activity manager 504 can determine a current activity score using a similar process. For example, instead of predicting a future activity score based on historical context data, the activity policies can generate policy scores based on current context data received from context store 112.

Figure 7:
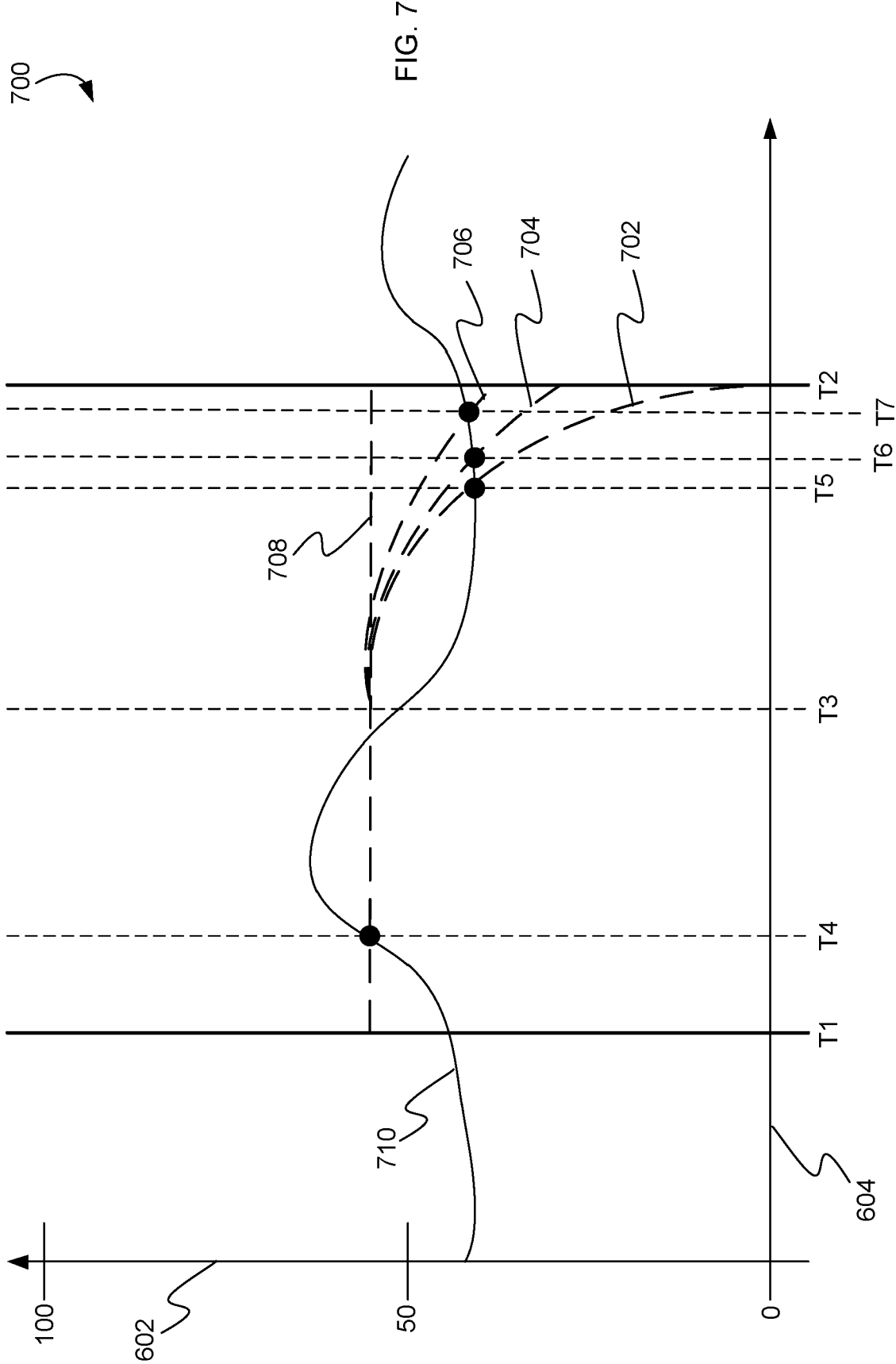
FIG. 7 is a graph illustrating example how to determine when to run an activity based on an optimal activity score and a current activity score.

FIG. 7 is a graph 700 illustrating example how to determine when to run an activity based on an optimal activity score and a current activity score. For example, activity manager 504 can determine when to execute an activity based on a current activity score exceeding a threshold value determine based on the optimal activity score. The threshold value can be a percentage (e.g., 90%, 80%, 75%, etc.) of the optimal score, for example.

In some implementations, the threshold value can change over time. For example, the threshold value can change based on the priority of the activity. As described above, an activity can have a high, medium, low, or maintenance priority. For example, the threshold value for each priority can be a constant value (e.g., 80% of optimal score) from the beginning of the activity time window at T1 to the time corresponding to the optimal score T3. This approach allows an opportunity for the best predicted context or conditions to occur at T3 before executing the requested activity.

After the optimal time at T3, the threshold value can be adjusted based on priority. For example, the threshold value for a high priority activity can be quickly reduced as time approaches the end of the activity time window at T2, as illustrated by line 702. The threshold value for a medium priority activity can be reduced as time approaches the end of the activity time window but not as quickly as a high priority activity, as illustrated by line 704. The threshold value for a low priority activity can be reduced as time approaches the end of the activity time window but not as quickly as a medium priority activity, as illustrated by line 706. The threshold value for a maintenance activity may or may not be reduced as time approaches the end of the activity time window but not as quickly as a high priority task, as illustrated by line 704.

As described above, when the current time corresponds to the beginning of the time window for a requested activity, activity manager 504 can begin requesting current activity scores for the requested activity. For example, as time progresses through the time window (e.g., T1-T2), activity manger 504 can request and receive current activity scores from activity scorer 508. Line 710 represents the current activity scores received by activity manager 504 over time.

When activity manager 504 receives a current activity score, activity manager 504 can compare the current activity score to the threshold value for the requested activity, as determined based on priority and optimal score. For example, if at time T4 the current activity score is greater (or equal to) the threshold value, activity manager 504 can notify the corresponding scheduler client to run the requested activity even though the current time (e.g., T4) is before the predicted optimal time at T3.

However, when the current activity scores obtained between the beginning of the activity time window (T1) and the optimal time (T3) never exceed the threshold value, the threshold value for the requested activity can be adjusted thereafter based on priority, as described above. For example, if the requested activity is a high priority activity, activity manager 504 can cause the corresponding activity to be run when the current activity score is greater than or equal to the high priority threshold value at time T5. If the requested activity is a medium priority activity, activity manager 504 can cause the corresponding activity to be run when the current activity score is greater than or equal to the medium priority threshold value at time T6. If the requested activity is a low priority activity, activity manager 504 can cause the corresponding activity to be run when the current activity score is greater than or equal to the low priority threshold value at time T7. If the requested activity is a maintenance activity, activity manager 504 may never cause the corresponding activity to be run because the current activity score is never greater than or equal to the maintenance priority threshold value represented by line 708. Thus, a high priority activity is almost guaranteed to be run by the end of the time window (e.g., at T2) while a maintenance task may not be run at all.

Coalescing Compatible Activities

In some implementations, activity manager 504 can determine compatible requested activities to run when a requested activity exceeds the threshold value. For example, activity request database 506 can store many different activity requests (e.g., activity request 502) from many different scheduler clients (e.g., scheduler client 404). When activity manger 504 determines that an activity corresponding to an activity request should be run (e.g., based on the threshold value described above), activity manager 504 can determine whether other compatible activities should be run based on the corresponding activity requests stored in activity request database 506.

In some implementations, activity manger 504 can determine that a compatible activity request is compatible with an activity request that is ready to be run. For example, compatibility can be determined based on activity requests that share similar or complementary context parameters. For example, activity manager 506 can determine that activity requests that share similar networking contexts should be run together. For example, activity manger 506 can determine that a networking activity associated with a first activity request should be run and then identify other compatible activity requests that specify time windows that correspond to the current time and that are also associated with networking activities so that the networking activities can be performed while the networking components of user device 110 are powered. Alternatively, activity manger 504 can identify activity requests with complementary context parameters. For example, an activity request that specifies a large amount of data to process may be run with an activity request that specifies a small amount of data to process. Thus, both activity requests can be run while the CPU is active without overwhelming user device 110.

After identifying the compatible activity requests, activity manager 504 can send each compatible activity request to activity scorer 508 to be scored based on the current context, as described above. Activity manager 504 can receive current activity scores for the compatible activity requests and compare the current activity score to threshold values based on the optimal activity score previously determined for each of the respective compatible activity requests to determine whether to run the corresponding activities. Thus, activity manger 504 can coalesce or run activities together when the activities share common context parameters and/or require similar computing resources.

In some implementations, the threshold value for a compatible activity request can be adjusted to allow the compatible activity request to be run with the first activity request. For example, after determining that the first activity request should be run, activity manager 504 can identify compatible activity requests, as described above. While the compatible activity request may be analyzed independently with respect to a first threshold value (e.g., 80% of the optimal activity score), the threshold value can be reduced (e.g., 70% of the optimal score, −10 points, −0.01 points, etc.) when the compatible activity is going to be run with another activity. Thus, by reducing the threshold score compatible activities can be run together thereby improving the efficiency of resource usage on user device 110.

In some implementations, activity manager 504 can enforce a limit on the number of activities that are run at a given time. For example, activity manager 504 can be configured to restrict the number of tasks that are run in parallel to a configured number of tasks. For example, an activity request from a scheduler client can specify a number of tasks that can be run in parallel with the task defined by the activity request. Alternatively, activity manager 504 can dynamically and/or automatically determine a limit on the number of tasks that can be run in parallel based on the performance of the device, the current load on the device's processor, available battery power, whether the device is connected to an external power source, the bandwidth available through the current network connection, and/or the type of the current network connection. Thus, activity manager 504 can determine a number of tasks to run that will have the least impact on device performance and/or network connectivity.

Example Processes

Figure 8:
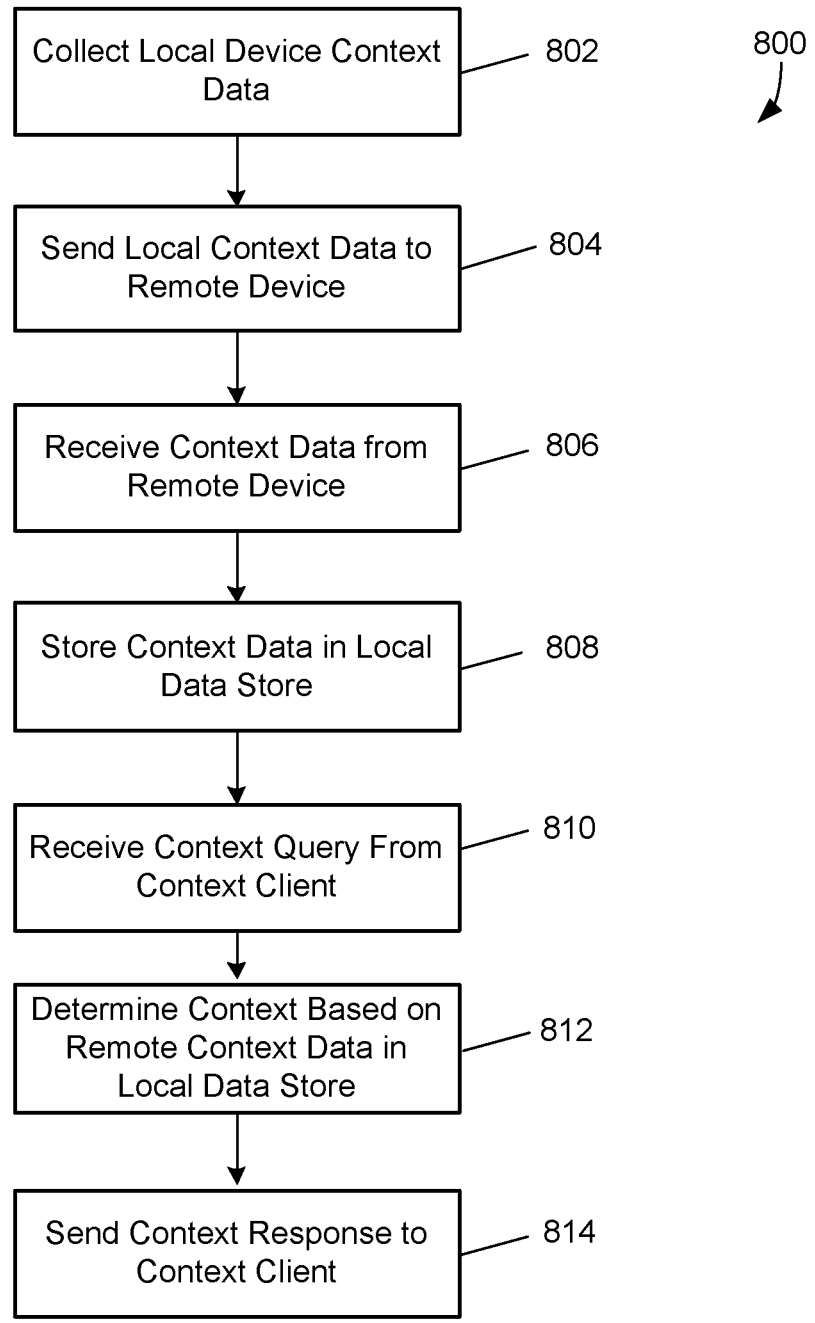
FIG. 8 is flow diagram of an example process for determining a context based on a multi-device context store.

FIG. 8 is flow diagram of an example process 800 for determining a context based on a multi-device context store. For example, a computing device (e.g., user device 110, user device 130) can collect context data (e.g., user context, device context, etc.) from multiple devices and provide context information to context clients so that the context clients can make decisions based on the collected context data. For example, rather than making decisions or determinations based solely on local context data or device state, the computing device can determine a user context based on context data or state data received from multiple devices and make more intelligent decisions based on the user context.

At step 802, user device 110 can collect local device context data. For example, context store 112 can collect context data (e.g., attribute-value data pairs) from local context clients (e.g., context client 118) running on user device 110.

At step 804, user device 110 can send local context data to remote user devices. For example, user device 110 can broadcast local context data updates using a device-to-device network connection or a traditional Wi-Fi, LAN, WAN or internet network connection. User device 110 can broadcast local context data periodically, in response to a local context data update, in response to another user device registering interest in local context data, and/or in response to a request for context data from another user device, as described above.

At step 806, user device 110 can receive context data from a remote user device. For example, user device 110 can receive context data from user device 130. For example, user device 130 can broadcast local context data updates using a device-to-device network connection or a traditional Wi-Fi, LAN, WAN or internet network connection. User device 130 can broadcast local context data periodically, in response to a local context data update, in response to another user device (e.g., user device 110) registering interest in context data collected by user device 130, and/or in response to a request for context data from another user device (e.g., user device 110), as described above.

At step 808, user device 110 can store context data in a local data store. For example, user device 110 can store local context data collected by context store 112 in local context database 114 on user device 110. User device can store remote context data received from user device 130 in remote context store database 116 on user device 110.

At step 810, user device 110 can receive a context query from a context client running on user device 110. For example, context client 118 can submit a query to context store 112 for context data. The query can specify the scope of the context query (e.g., local device, specified remote device, all user devices, etc.). The query can specify whether context client 118 is interested in future context updates or is just requesting current context data. The query can request specify specific context data to be returned by context client 118. For example, the context data can be specified by identifying attributes and/or attribute values for which context client 118 would like to receive context data and/or notifications.

At step 812, user device 110 can determine the requested context based on the remote context data in the local data store. For example, context store 112 can obtain from local context database 114 and/or remote context database 116 context data (e.g., attribute-value data pairs) corresponding to the context query received from context client 118. For example, context store 110 can determine the requested context once for each context query. Alternatively, context store 110 can determine the requested context on an ongoing basis (e.g., after a context client registers interest in context data) when a value for a requested attribute changes.

At step 814, user device 110 can send a context response to the context client. For example, context store 112 can generate a context response that includes the requested context data (e.g., local context data and/or remote context data). Context store 112 can send the context response to context client 118. Context client 118 can then perform an operation based on the local context and/or remote context data received from context store 112. For example, context client 118 can determine a user context based on a combination of local context data and remote context data and then perform an operation (e.g., provide a service to the user, present a notification or other information, etc.) to the user based on the determined user context.

Figure 9:
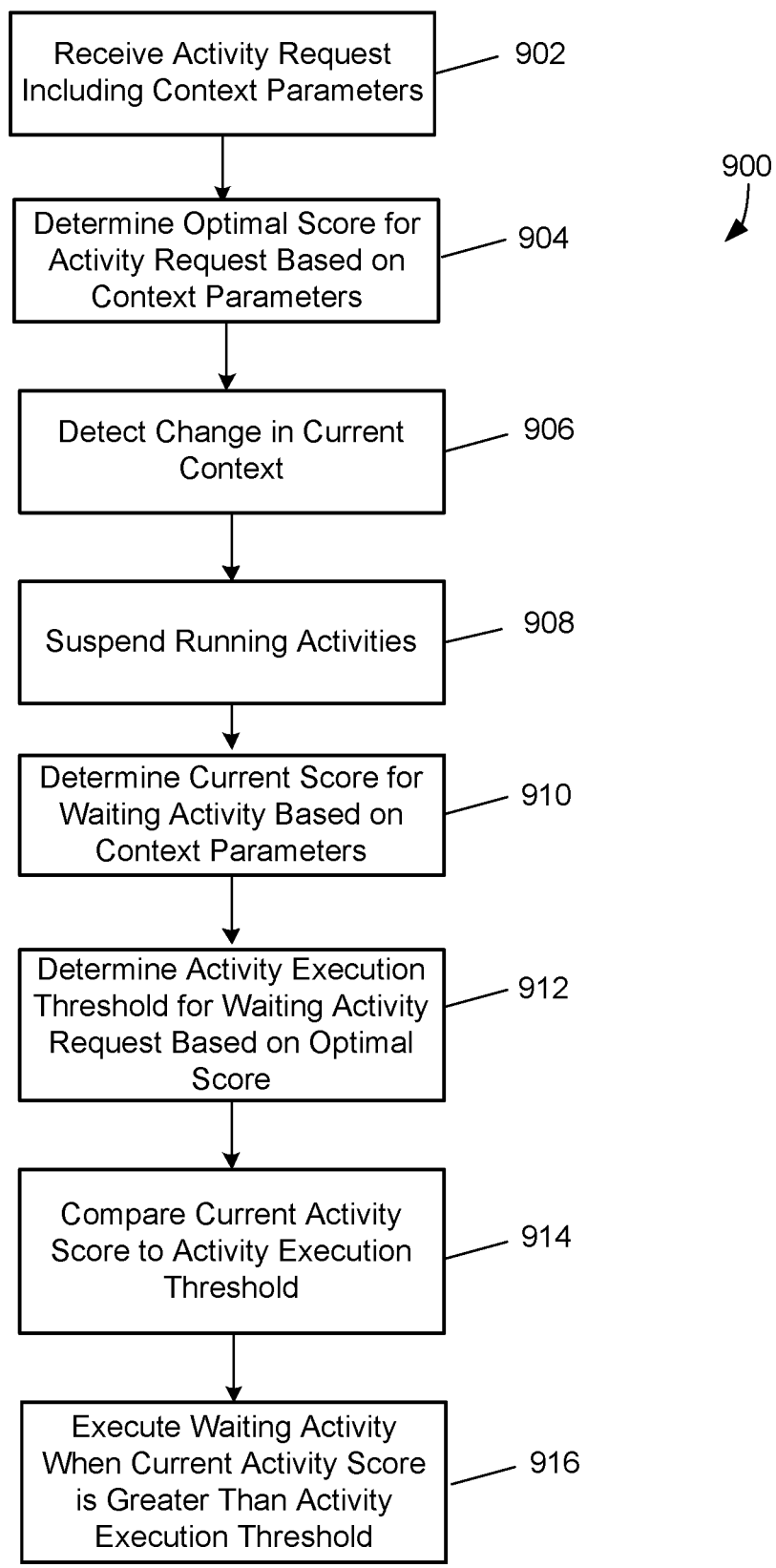
FIG. 9 is a flow diagram of an example process for scheduling activities based on a current context.

FIG. 9 is a flow diagram of an example process 900 for scheduling activities based on a current context. For example, user device 110 can initiate an activity when the current context data of the device and/or user is optimal for executing the activity.

At step 902, user device 110 can receive an activity request including context parameters. For example, activity scheduler 402 can receive an activity request from a scheduler client 404 that specifies parameters for performing a corresponding activity. The activity request can, for example, define a time window (e.g., start time, end time) for performing a corresponding activity. The activity request can specify a priority (e.g., high, medium, low, maintenance) for the activity. The activity request can specify a context (e.g., user context, device context, etc.) for executing the corresponding activity. For example, the activity request can include attribute-value pairs of data that describe or defined the context needed to run the corresponding activity.

At step 904, user device 110 can determine an optimal score for the activity request based on the context parameters specified in the activity request. For example, activity scheduler 402 can determine an optimal score for the activity request based on the parameters defined by the activity request and historical context data, as described above.

At step 906, user device 110 can detect a change in the current context. For example, activity scheduler 402 can receive current context data from context store 112 indicating that context data obtained by context store 112 has changed, as described above.

At step 908, user device 110 can suspend activities running on user device 112. For example, activity scheduler 402 can determine which running activities, if any, have been running for longer than the time specified in (or derived from) the corresponding activity request and suspend one or more of the activities to free up resources to run new activities based on pending activity requests.

At step 910, user device 110 can determine a current score for a waiting activity based on the context parameters specified in the corresponding activity request. For example, activity scheduler 402 can determine when the current time corresponds to the start time of a time window specified in an activity request. While the current time moves through the time window (e.g., every 1 minute, every 30 seconds, etc.) of the activity request, activity scheduler 402 can determine a current activity score for the activity request based on the current context data received from context store 112, as described above.

At step 912, user device 110 can determine an activity execution threshold for the waiting activity request based on the optimal score. For example, activity scheduler 402 can determine an activity execution threshold as a percentage (e.g., 90%, 85%, etc.) of the optimal score. In some implementations, the activity execution threshold can be adjusted based on the predicted time (e.g., optimal time) of the optimal score, the priority of the activity request, how close the current time is to the end of the activity request time window, and/or whether the activity request is being coalesced with another activity request, as described above.

At step 914, user device 110 can compare the current activity score to the activity execution threshold. For example, activity scheduler 402 can determine when the current activity score is greater than or equal to the activity execution threshold.

At step 916, user device 110 can execute the waiting activity when the current activity score is greater than the activity execution threshold. For example, activity scheduler 402 can when the current activity score is greater than or equal to the activity execution threshold and send a message to the scheduler client (e.g., scheduler client 404) to cause the scheduler client to perform the activity corresponding to the activity request.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 10:
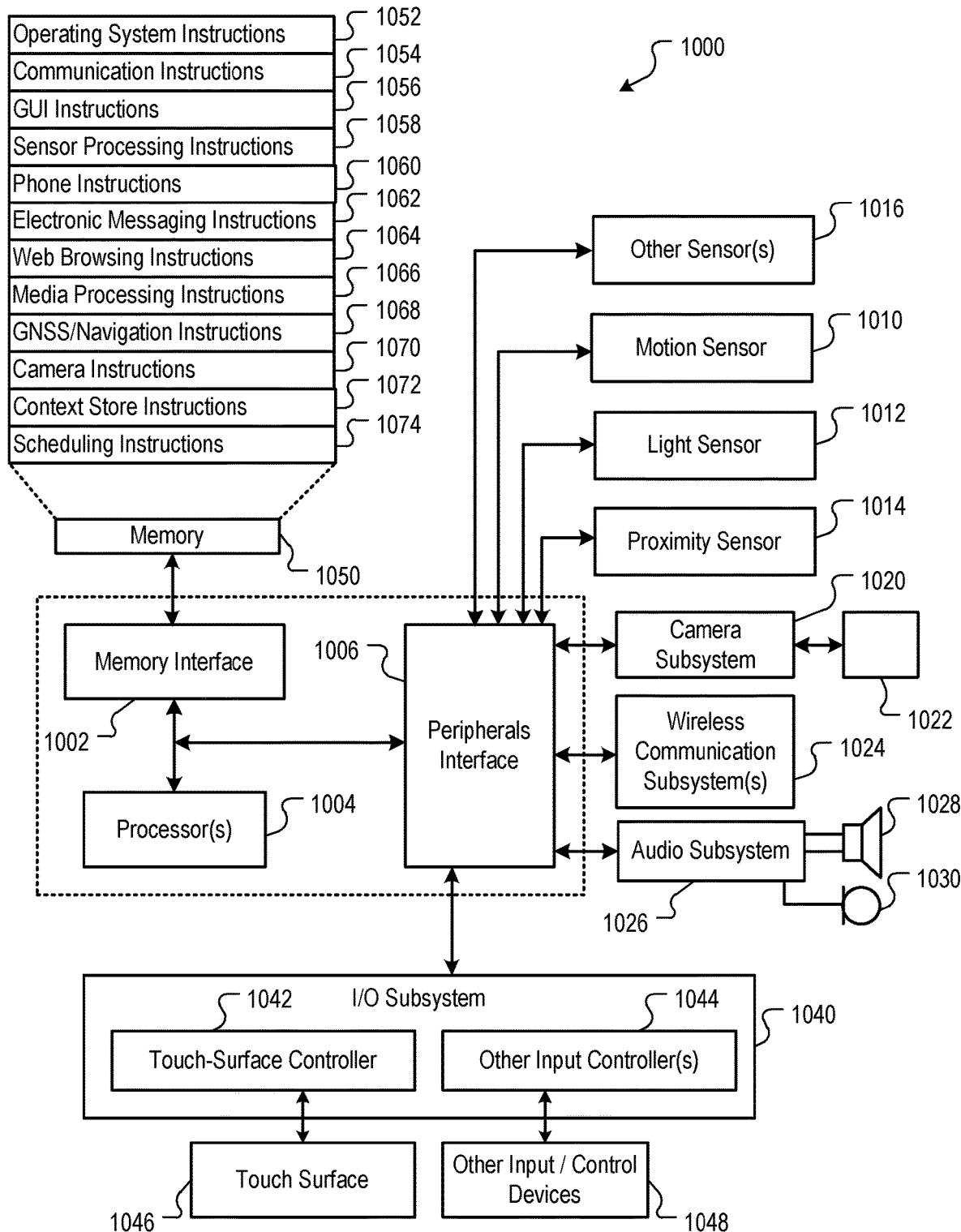
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network (s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 100 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™. The computing device 1000 can, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing voice authentication. For example, operating system 1052 can implement the multi-device context store and/or context store features as described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 can store software instructions 1072 and/or software instructions 1074 to facilitate other processes and functions, such as the multi-device context store and/or context store processes and functions as described with reference to FIGS. 1-9.

The memory 1050 can also store other software instructions (not shown), such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method to provide user context across multiple devices, the method comprising:
    storing, by a local device, local context data corresponding to the local device associated with a user;
    receiving and storing, by the local device, remote context data corresponding to at least one remote device associated with the user;
    receiving, from a context client by the local device, a context query specifying at least one context data attribute;
    based on the context query, determining user context comprising both: (a) a first data value for the context data attribute from the local context data corresponding to the local device associated with the user, and (b) a second data value for the same context data attribute from the remote context data corresponding to the at least one remote device associated with the user;
    selecting a latest data value, of the first data value and the second data value, as a current context value for the context data attribute; and sending, by the local device to the context client, the current context value corresponding to the context data attribute.

2. The method of claim 1, further comprising:
receiving, by the local device, at least some of the remote context data from one or more of a plurality of remote devices associated with the user, the remote context data including device state information corresponding to the one or more of the plurality of remote devices.

3. The method of claim 1, wherein the context query specifies a subset of context data attributes to be broadcast periodically, the method further comprising:
periodically broadcasting a subset of context values corresponding to the subset of context data attributes obtained from at least one of: the stored local context data and the stored remote context data.

4. The method of claim 1,
wherein the local device is selected from a group consisting of: a smartphone device, a tablet computer, and a laptop computer;
wherein the local context data is selected from a group consisting of: user-specific context, network-specific context, and device-specific context; and
wherein the remote context data is selected from a group consisting of: user-specific context, network-specific context, and device-specific context.

5. The method of claim 1, wherein receiving and storing the remote context data further comprises:
receiving, by the local device, at least some of the remote context data from a particular remote device associated with the user that includes device state information for a third device that is paired with the particular remote device,
wherein the third device is not paired with the local device,
wherein the third device is a wearable device paired to the particular remote device, and
wherein the device state information comprises information about a state of one or more hardware elements of the wearable device.

6. The method of claim 1, wherein the context query includes a request for context updates for the context data attribute, the method further comprising:
determining, by the local device, that a value of one or more particular attributes corresponding to the context data attribute has changed on the local device after sending the current context value to the context client; and
in response to determining that the value of the one or more particular attributes has changed on the local device, transmitting, by the local device, a context update message to the context client indicating a changed value of the one or more particular attributes.

7. The method of claim 1, further comprising:
receiving, by the local device, a message from the context client indicating that the context client is interested in a value of a particular attribute, wherein the message specifies a threshold value for the particular attribute;
determining, by the local device, that the value of the particular attribute has changed on the local device to pass the threshold value specified in the message; and
in response to determining that the value of the particular attribute has passed the threshold value on the local device, transmitting, by the local device, a context update message to the context client indicating that the value of the particular attribute has passed the threshold value.

8. The method of claim 1, wherein the operations further comprise determining the latest data value, of the first data value and the second data value, based on which of the local device and the at least one remote device received a latest user input from the user.

9. The method of claim 1, further comprising:
determining a second set of current context values based on the user context, the second set of current context values comprising a first subset of the current context values based on the local context data and a second subset of the current context values based on the remote context data; and
sending, by the local device to the context client, the second set of current context values in response to a second context query.

10. The method of claim 1, wherein determining the current context values corresponding to the context data attributes comprises:
determining a first set of location information for the user based on the local context data;
determining a second set of location information for the user based on the remote context data; and
selecting the latest data from: (a) the first set of location information, and (b) the second set of location information.

11. The method of claim 1, wherein the local context data comprises state data detected by the local device, and wherein the remote context data comprises state data detected by the at least one remote device.

12. The method of claim 1, wherein the local context data and the remote context data are selected from a group consisting of: a device location, identification of an activity being performed, a device state, an application state, a display status, a wireless connection status, cellular data status, a device movement status, a device battery level, an external power connection status, and a timestamp of last user interaction.

13. A non-transitory computer-readable medium for providing user context across multiple devices, the non-transitory computer-readable medium including one or more sequences of instructions that, when executed by one or more processors, causes:
storing, by a local device, local context data corresponding to the local device associated with a user;
receiving and storing, by the local device, remote context data corresponding to at least one remote device associated with the user;
receiving, from a context client by the local device, a context query specifying at least one context data attribute;
based on the context query, determining user context comprising both: (a) a first data value for the context data attribute from the local context data corresponding to the local device associated with the user, and (b) a second data value for the same context data attribute from the remote context data corresponding to the at least one remote device associated with the user;
selecting a latest data value, of the first data value and the second data value, as a current context value for the context data attribute; and
sending, by the local device to the context client, the current context value corresponding to the context data attribute.

14. The non-transitory computer-readable medium of claim 13, wherein the instructions cause:
receiving, by the local device, at least some of the remote context data from one or more of a plurality of remote devices associated with the user, the remote context data including device state information corresponding to the one or more of the plurality of remote devices.

15. The non-transitory computer-readable medium of claim 13, wherein the context query specifies a subset of context data attributes to be broadcast periodically, and wherein the instructions cause:
periodically broadcasting a subset of context values corresponding to the subset of context data attributes obtained from at least one of: the stored local context data and the stored remote context data.

16. The non-transitory computer-readable medium of claim 13,
wherein the local device is selected from a group consisting of: a smartphone device, a tablet computer, and a laptop computer;
wherein the local context data is selected from a group consisting of: user-specific context, network-specific context, and device-specific context; and
wherein the remote context data is selected from a group consisting of: user-specific context, network-specific context, and device-specific context.

17. The non-transitory computer-readable medium of claim 13, wherein the instructions that cause receiving and storing the remote context data further cause:
receiving, by the local device, at least some of the remote context data from a particular remote device associated with the user that includes device state information for a third device that is paired with the particular remote device,
wherein the third device is not paired with the local device, wherein the third device is a wearable device paired to the particular remote device, and
wherein the device state information comprises information about a state of one or more hardware elements of the wearable device.

18. The non-transitory computer-readable medium of claim 13, wherein the context query includes a request for context updates for the context data attribute, and wherein the instructions cause:
determining, by the local device, that a value of one or more particular attributes corresponding to the context data attribute has changed on the local device after sending the current context value to the context client; and
in response to determining that the value of the one or more particular attributes has changed on the local device, transmitting, by the local device, a context update message to the context client indicating a changed value of the one or more particular attributes.

19. The non-transitory computer-readable medium of claim 13, wherein the instructions cause:
receiving, by the local device, a message from the context client indicating that the context client is interested in a value of a particular attribute, wherein the message specifies a threshold value for the particular attribute;
determining, by the local device, that the value of the particular attribute has changed on the local device to pass the threshold value specified in the message; and
in response to determining that the value of the particular attribute has passed the threshold value on the local device, transmitting, by the local device, a context update message to the context client indicating that the value of the particular attribute has passed the threshold value.

20. A system for providing user context across multiple devices, the system comprising:
one or more processors; and
a non-transitory computer-readable medium including one or more sequences of instructions that, when executed by the one or more processors, causes:
storing, by a local device, local context data corresponding to the local device associated with a user;
receiving and storing, by the local device, remote context data corresponding to at least one remote device associated with the user;
receiving, from a context client by the local device, a context query specifying at least one context data attribute;
based on the context query, determining user context comprising both: (a) a first data value for the context data attribute from the local context data corresponding to the local device associated with the user, and (b) a second data value for the same context data attribute from the remote context data corresponding to the at least one remote device associated with the user;
selecting a latest data value, of the first data value and the second data value, as a current context value for the context data attribute; and
sending, by the local device to the context client, the current context value corresponding to the context data attributes to the context client.

21. The system of claim 20, wherein the instructions cause:
receiving, by the local device, at least some of the remote context data from one or more of a plurality of remote devices associated with the user, the remote context data including device state information corresponding to the one or more of the plurality of remote devices.

22. The system of claim 20, wherein the context query specifies a subset of context data attributes to be broadcast periodically, and wherein the instructions cause:
periodically broadcasting a subset of context values corresponding to the subset of context data attributes obtained from at least one of: the local context database and the plurality of remote context databases.

23. The system of claim 20,
wherein the local device is selected from a group consisting of: a smartphone device, a tablet computer, and a laptop computer;
wherein the local context data is selected from a group consisting of: user-specific context, network-specific context, and device-specific context; and
wherein the remote context data is selected from a group consisting of: user-specific context, network-specific context, and device-specific context.

24. The system of claim 20, wherein the instructions that cause receiving and storing the remote context data further cause:
receiving, by the local device, at least some of the remote context data from a particular remote device associated with the user that includes device state information for a third device that is paired with the particular remote device,
wherein the third device is not paired with the local device, wherein the third device is a wearable device paired to the particular remote device, and
wherein the device state information comprises information about a state of one or more hardware elements of the wearable device.

25. The system of claim 20, wherein the context query includes a request for context updates for the context data attribute, and wherein the instructions cause:

determining, by the local device, that a value of one or more particular attributes corresponding to the context data attribute has changed on the local device after sending the current context value to the context client; and in response to determining that the value of the one or more particular attributes has changed on the local device, transmitting, by the local device, a context update message to the context client indicating a changed value of the one or more particular attributes.

26. The system of claim 20, wherein the instructions cause:

receiving, by the local device, a message from the context client indicating that the context client is interested in a value of a particular attribute, wherein the message specifies a threshold value for the particular attribute;

determining, by the local device, that the value of the particular attribute has changed on the local device to pass the threshold value specified in the message; and in response to determining that the value of the particular attribute has passed the threshold value on the local device, transmitting, by the local device, a context update message to the context client indicating that the value of the particular attribute has passed the threshold value.

* * * * *